United States Patent
Maruyama et al.

(10) Patent No.: US 11,560,476 B2
(45) Date of Patent: *Jan. 24, 2023

(54) EPOXY RESIN, EPOXY RESIN COMPOSITION, EPOXY RESIN CURED PRODUCT, AND COMPOSITE MATERIAL

(71) Applicant: Showa Denko Materials Co., Ltd., Tokyo (JP)

(72) Inventors: Naoki Maruyama, Tokyo (JP); Yuka Yoshida, Tokyo (JP); Tomoko Higashiuchi, Tokyo (JP); Kazumasa Fukuda, Tokyo (JP); Keiichiro Nishimura, Tokyo (JP); Yoshitaka Takezawa, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/651,015

(22) PCT Filed: Sep. 29, 2017

(86) PCT No.: PCT/JP2017/035658
§ 371 (c)(1),
(2) Date: Mar. 26, 2020

(87) PCT Pub. No.: WO2019/064544
PCT Pub. Date: Apr. 4, 2019

(65) Prior Publication Data
US 2020/0270447 A1 Aug. 27, 2020

(51) Int. Cl.
*C08L 63/00* (2006.01)
*C08G 59/24* (2006.01)

(52) U.S. Cl.
CPC ............ *C08L 63/00* (2013.01); *C08G 59/245* (2013.01)

(58) Field of Classification Search
CPC .............................. C08L 63/00; C08G 59/245
USPC .......................................................... 523/404
See application file for complete search history.

(56) References Cited

U.S. PATENT DOCUMENTS

| | | | | |
|---|---|---|---|---|
| 5,391,651 A * | 2/1995 | Earls | .................... | C07D 303/24 525/484 |
| 2003/0229159 A1 * | 12/2003 | Akatsuka | ............... | C08G 59/02 523/457 |

FOREIGN PATENT DOCUMENTS

| | | | | |
|---|---|---|---|---|
| CN | 107108856 A | 8/2017 | | |
| EP | 3239206 A1 | 11/2017 | | |
| WO | WO-2009/110424 A1 | 9/2009 | | |
| WO | WO-2016/104772 A1 | 6/2016 | | |
| WO | WO-2016098709 A1 * | 6/2016 | ............. | C08G 59/62 |

OTHER PUBLICATIONS

Yoshida et al., WO 2016/098709 A1 machine translation in English, Jun. 23, 2016 (Year: 2016).*

Yoshihara et al., "Development of Novel Highly Thermally Conductive Resin for Injection Molding by Increasing Thermal Conductivity of Base Resin—Orientation of crystalline lamella and thermal conductivity of main chain-type liquid crystalline polyester—," Polymer Preprints, Japan, 61(1), 625(2012).

* cited by examiner

*Primary Examiner* — David T Karst
(74) *Attorney, Agent, or Firm* — Faegre Drinker Biddle & Reath LLP

(57) ABSTRACT

An epoxy resin, comprising an epoxy compound A that has at least two mesogenic structures and at least one phenylene group, and an epoxy compound B that has at least two mesogenic structures and at least one divalent biphenyl group.

6 Claims, No Drawings

EPOXY RESIN, EPOXY RESIN COMPOSITION, EPOXY RESIN CURED PRODUCT, AND COMPOSITE MATERIAL

TECHNICAL FIELD

The invention relates to an epoxy resin, an epoxy resin composition, an epoxy resin cured product, and a composite material.

BACKGROUND ART

Epoxy resin is widely used as a matrix resin for fiber-reinforced plastics (FRPs). Recently, epoxy resin is also used as a matrix resin of FRPs for aerospace applications that require a high level of various physical properties such as fracture toughness, elasticity and heat resistance. However, while thermosetting resins, such as epoxy resin, have superior heat resistance, they tend to have lower fracture toughness as compared with thermoplastic resins.

As a method for improving the fracture toughness of epoxy resin, a method of increasing the degree of orientation of molecules in a cured product by introducing a mesogenic structure into the molecule is known, for example.

An epoxy resin having a mesogenic structure in its molecule (hereinafter, also referred to as a mesogen-containing epoxy resin) has higher crystallinity and viscosity as compared with other epoxy resins. Therefore, fluidity may not be sufficient during processing. Therefore, in order to improve the fluidity of a mesogen-containing epoxy resin, a method of obtaining an epoxy compound having a specific molecular weight via a reaction between an epoxy monomer having a mesogenic structure and a divalent phenol compound has been proposed (see, for example, Patent Document 1).

Further, it has been reported that molecules of liquid-crystalline polyester become oriented in one direction while the resin flows in a mold upon application of a shear, during a process of injection molding (see, for example, Non-Patent Document 1).

PRIOR ART DOCUMENTS

Patent Document

[Patent Document 1] International Publication No. WO 2016-104772 Non-Patent Document
[Non-Patent Document 1] Yoshihara et al., Polymer Preprints, Japan, 61(1), 625(2012)

SUMMARY OF THE INVENTION

Problem to be Solved by the Invention

The mesogen-containing epoxy resin obtained by the method described in Patent Document 1 achieves a lowered softening point, but still has high crystallinity. As a result, it is difficult to use this resin for a coating process without a solvent due to high viscosity under the temperature conditions during processing, and there is room for improvement of the epoxy resin from the viewpoint of processing compatibility.

In addition, even if the viscosity could be lowered under the temperature conditions during processing, other factors that may raise the viscosity need to be considered (for example, the molecules become oriented by the resin flowing with shear).

In view of the foregoing, the invention aims to provide an epoxy resin and an epoxy resin composition having excellent viscosity stability during processing. The invention also aims to provide an epoxy resin cured product and a composite material obtained by using the epoxy resin or the epoxy resin composition.

Means for Solving the Problem

The means for solving the problem include the following embodiments.

<1> An epoxy resin, comprising an epoxy compound A that has at least two mesogenic structures and at least one phenylene group, and an epoxy compound B that has at least two mesogenic structures and at least one divalent biphenyl group.

<2> The epoxy resin according to <1>, wherein at least one of the epoxy compound A or the epoxy compound B has a structure in which the phenylene group or the divalent biphenyl group is disposed between the at least two mesogenic structures.

<3> The epoxy resin according to <1> or <2>, wherein at least one of the at least two mesogenic structures of at least one of the epoxy compound A or the epoxy compound B has a structure represented by the following Formula (3):

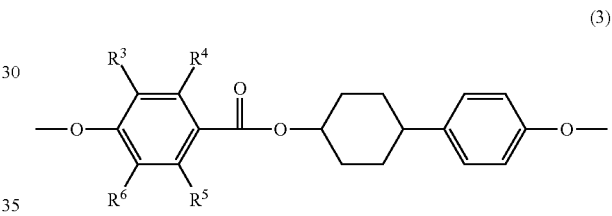

(3)

wherein, in Formula (3), each of $R^3$ to $R^6$ independently represents a hydrogen atom or an alkyl group having 1 to 3 carbon atoms.

<4> An epoxy resin composition, comprising the epoxy resin according to any one of <1> to <3> and a curing agent.

<5> The epoxy resin composition according to <4>, being configured to form a smectic structure in a cured state.

<6> An epoxy resin cured product comprising a cured product of the epoxy resin composition according to <4> or <5>.

<7> A reinforcing material, comprising the epoxy resin cured product according to <6> and a reinforcing material.

Effects of the Invention

According to the invention, an epoxy resin and an epoxy resin composition having excellent viscosity stability during processing is provided. Also, an epoxy resin cured product and a composite material, obtained by using the epoxy resin or the epoxy resin composition, are provided.

Embodiments for Implementing the Invention

In the following, embodiments for implementing the invention are explained. However the invention is not limited to the embodiments. The elements of the embodiments (including steps) are not essential, unless otherwise stated. Further, numbers and numerical ranges do not limit the invention.

In the disclosure, the "process" refers not only to a process that is independent from the other steps, but also to a step that cannot be clearly distinguished from the other steps, as long as the aim of the process is achieved.

In the disclosure, the numerical range represented by "from A to B" includes A and B as a minimum value and a maximum value, respectively.

In the disclosure, when numerical ranges are described in a stepwise manner, the values of the upper or lower limit of each numerical range may be substituted by the values of the upper or lower limit of the other numerical range, or may be substituted by the values described in the Examples.

In the disclosure, when there are more than one kind of substance corresponding to a component of a composition, the content of the component refers to a total content of the substances, unless otherwise stated.

In the disclosure, when there are more than one kind of particles corresponding to a component of a composition, the particle size of the component refers to a particle size of a mixture of the more than one kind of particles.

In the disclosure, the epoxy compound refers to a compound having an epoxy group in its molecule. The epoxy resin refers to a collective concept of epoxy compounds that are not in a cured state.

<Epoxy Resin>

The epoxy resin of the disclosure includes an epoxy compound A that has at least two mesogenic structures and at least one phenylene group, and an epoxy compound B that has at least two mesogenic structures and at least one divalent biphenyl group.

In the disclosure, when the at least two mesogenic structures of epoxy compound A include a phenylene group therein, the phenylene group is not regarded as the "at least one phenylene group". When the at least two mesogenic structures of epoxy compound B include a divalent biphenyl group therein, the divalent biphenyl group is not regarded as the "at least one divalent biphenyl group".

The epoxy compound A and epoxy compound B included in the epoxy resin may be a single kind or a combination of two or more kinds, respectively. The mesogenic structures included in epoxy compound A and epoxy compound B may be the same or different from each other.

The research made by the inventors has found that the epoxy resin including epoxy compound B is more likely to reduce its viscosity as the temperature is increased, as compared with an epoxy resin that includes a compound described in Patent Document 1, which is obtained by reaction of an epoxy monomer having a mesogenic structure and a divalent phenol compound (epoxy compound A), and exhibits excellent ease of handling. Specifically, while epoxy resin A, having a phenylene group in the molecule, is in a smectic liquid crystal phase at a temperature during processing (for example, 100° C. or lower), epoxy compound B, having a biphenyl group in the molecule, is in a nematic liquid crystal phase or an isotropic phase at a temperature range from ordinary temperature (25° C.) to 150° C. The reason for this is considered to be that the biphenyl group in epoxy compound B has a greater molecular weight than the phenylene group and is less orientational, and therefore less likely to form a smectic liquid crystal phase that is a higher-order structure. As a result, it is considered that the epoxy resin including epoxy compound B is lower in viscosity at the operation temperature and has a higher fluidity, as compared with an epoxy resin including epoxy compound A.

Further, the research has found that the epoxy resin including both epoxy compound A and epoxy compound B exhibits excellent viscosity stability upon application of continuous shear stress. The reason for this is considered to be that epoxy compound B, having a biphenyl group in the molecule, is more likely to become oriented upon application of a physical stimulus such as shear stress, as compared with epoxy compound A, having a phenylene group in the molecule. As a result, it is considered that the viscosity is more likely to increase upon application of continuous shear stress during mixing the epoxy resin with a curing agent.

The epoxy resin of the disclosure satisfies both the reduction in viscosity at a temperature range for processing and the stability in viscosity upon application of continuous shear stress, by including both epoxy compound A and epoxy compound B.

The mass ratio of epoxy compound A and epoxy compound B in the epoxy resin is not particularly limited. From the viewpoint of satisfying both the reduction in viscosity at a temperature range for processing and the stability in viscosity upon application of continuous shear stress, the ratio between epoxy compound A and epoxy compound B (epoxy compound A:epoxy compound B) is preferably from 1:9 to 9:1, more preferably from 3:7 to 9:1, further preferably from 4:6 to 8:2, yet further preferably from 6:4 to 8:2.

The epoxy resin may include an epoxy compound other than epoxy compound A and epoxy compound B. For example, the epoxy resin may include a mesogenic epoxy monomer as described below.

When the epoxy resin includes an epoxy compound that is not epoxy compound A or epoxy compound B, the total content of epoxy compound A and epoxy compound B is not particularly limited. For example, the total content of epoxy compound A and epoxy compound B is preferably from 70% by mass to 99% by mass of the total epoxy resin, more preferably from 80% by mass to 99% by mass, further preferably from 90% by mass to 99% by mass.

(Specific Epoxy Compound)

The structure of epoxy compound A and epoxy compound B (hereinafter, collectively referred to as the specific epoxy compound) is not particularly limited, as long as at least two mesogenic structures and at least one phenylene group or divalent biphenyl group are included therein.

The at least two mesogenic structures included in one molecule of the specific epoxy compound may be the same or different from each other.

The mesogenic structure refers to a structure of an epoxy compound that is included in an epoxy resin that is capable of exhibiting liquid crystallinity.

Examples of the mesogenic structure of the specific epoxy compound include a biphenyl structure, a phenyl benzoate structure, a cyclohexyl benzoate structure, an azobenzene structure, a stilbene structure, a terphenyl structure, an anthracene structure, derivatives of these structures, and a structure in which two or more of these structures are linked via a linking group.

An epoxy resin including an epoxy compound having a mesogenic structure forms, in a cured product, a higher-order structure. In the disclosure, the higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of an island, wherein each island corresponds to a higher-order structure. The structural elements of the higher-order structure are generally formed by covalent bonding.

Examples of a higher-order structure formed in a cured product include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. Therefore, a smectic structure is preferred in terms of thermal conductivity and fracture toughness of a cured product.

Whether or not a smectic structure is formed in a cured product of the epoxy resin can be determined by X-ray diffraction measurement by using, for example, an X-ray diffractometer from Rigaku Corporation. When the measurement is performed using CuKα1 line under a tube voltage of 40 kV, a tube current of 20 mA and a measurement range 2θ=2° to 30°, and a diffraction peak is observed in a range of 2θ=2° to 10°, it is determined that a smectic structure is formed in a cured product.

The mesogenic structure of the specific epoxy compound may be a structure represented by the following Formula (1).

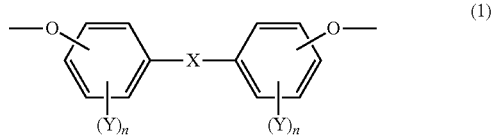

In Formula (1), X represents a single bond or a linking group that includes at least one divalent group selected from the following Group (A). Each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

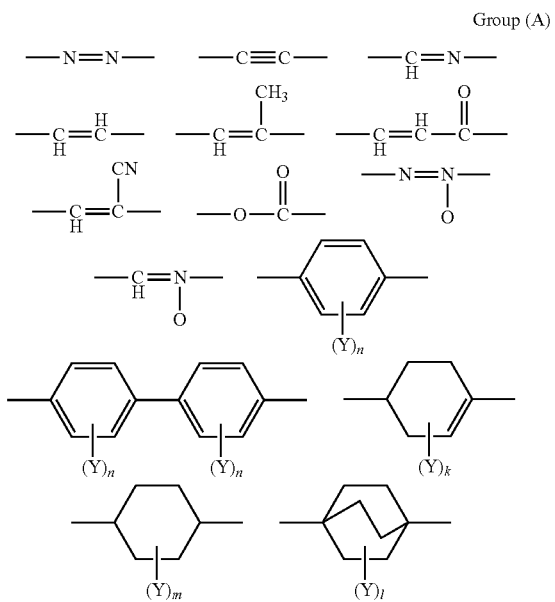

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In the mesogenic structure represented by Formula (1), when X is at least one linking group selected from the divalent groups in Group (A), X is preferably at least one linking group selected from the divalent groups included in the following Group (Aa); more preferably a linking group that is selected from the divalent groups included in the following Group (Aa) and has a ring structure.

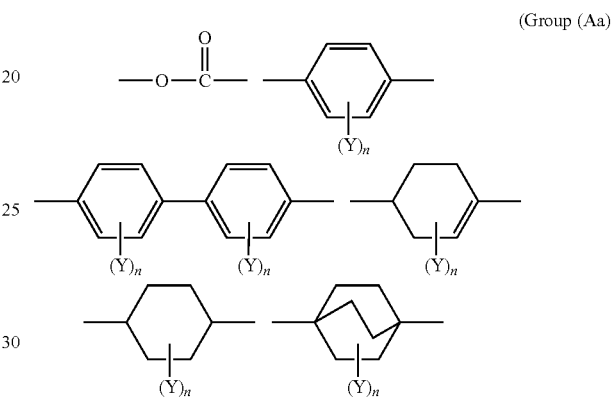

In Group (Aa), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

It is preferred that at least one of the mesogenic structures, included in at least one of epoxy compound A or epoxy compound B, is a mesogenic structure represented by the following Formula (2); and it is more preferred that all of mesogenic structures, included in at least one of epoxy compound A or epoxy compound B, are a mesogenic structure represented by the following Formula (2).

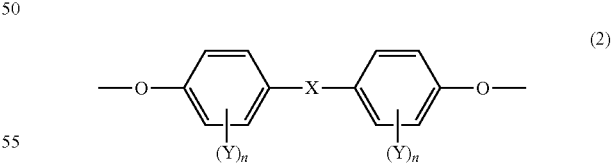

In Formula (2), definitions and preferred examples of X, Y and n are the same as the definitions and preferred examples of X, Y and n in Formula (1).

It is preferred that at least one of the mesogenic structures, included in at least one of epoxy compound A or epoxy compound B, is a mesogenic structure represented by the following Formula (3); and it is more preferred that all of mesogenic structures, included in at least one of epoxy compound A or epoxy compound B, are a mesogenic structure represented by the following Formula (3).

(3)

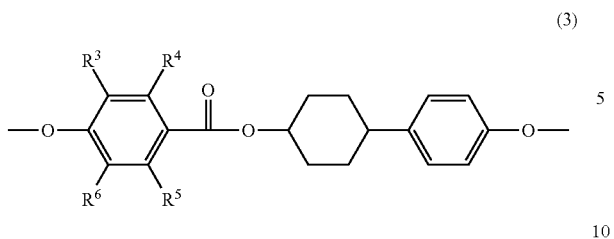

In Formula (3), each of $R^3$ to $R^6$ independently represents a hydrogen atom or an alkyl group having 1 to 3 carbon atoms.

Each of $R^3$ to $R^6$ is preferably independently a hydrogen atom or an alkyl group having 1 or 2 carbon atoms, more preferably a hydrogen atom or a methyl group, further preferably a hydrogen atom. The number of hydrogen atoms represented by $R^3$ to $R^6$ is preferably 2 to 4, more preferably 3 or 4, further preferably 4. When any one of $R^3$ to $R^6$ is an alkyl group having 1 to 3 carbon atoms, at least one of $R^3$ or $R^6$ is preferably an alkyl group having 1 to 3 carbon atoms.

When the specific epoxy compound is epoxy compound A, examples of the phenylene group included in epoxy compound A include a structure represented by the following Formula (5A).

When the specific epoxy compound is epoxy compound B, examples of the divalent biphenyl group included in epoxy compound B include a structure represented by the following Formula (5B).

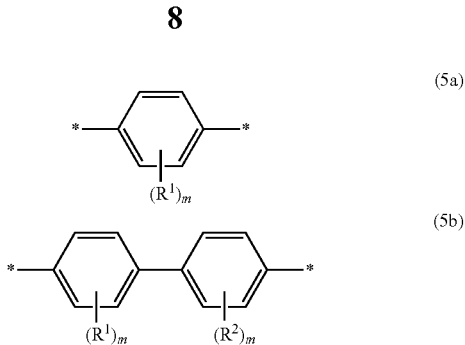

In Formula (5A) and Formula (5B), * represents a bonding site to an adjacent atom. Examples of the adjacent atom include an oxygen atom and a nitrogen atom. Each of $R^1$ and $R^2$ independently represents a monovalent alkyl group having 1 to 8 carbon atoms. Each m independently is an integer from 0 to 4.

Each of $R^1$ and $R^2$ independently represents a alkyl group having 1 to 8 carbon atoms, more preferably an alkyl group having 1 to 3 carbon atoms, further preferably a methyl group.

Each of m independently preferably an integer from 0 to 2, more preferably 0 or 1, further preferably 0.

Among the structures represented by Formula (5A), a structure represented by the following Formula (5a) is preferred, and among the structures represented by Formula (5B), a structure represented by the following Formula (5b) is preferred. An epoxy compound having a structure represented by Formula (5a) or Formula (5b) tends to have a linear molecular structure, and therefore, it is considered to have a high degree of molecular stacking property and easier to form a higher-order structure.

In Formulae (5a) and (5b), definitions and preferred examples of *, $R^1$, $R^2$ and m are the same as the definitions and preferred examples of *, $R^1$, $R^2$ and m in Formulae (5A) and (5B).

The specific epoxy compound A preferably has a structure in which one phenylene group or one divalent biphenyl group is disposed between two mesogenic structures represented by Formula (1).

Specific embodiments of the "structure in which one phenylene group or one divalent biphenyl group is disposed between two mesogenic structures represented by Formula (1)" is not particularly limited. For example, the structure may be a state in which an epoxy group of a compound, which has a mesogenic structure and an epoxy group, is reacted with a functional group capable of reacting with an epoxy group of an epoxy compound, which has a phenylene group or a biphenyl group and the functional group.

The specific epoxy compound may be an epoxy compound having a structure represented by the following Formula (1-A) or Formula (1-B).

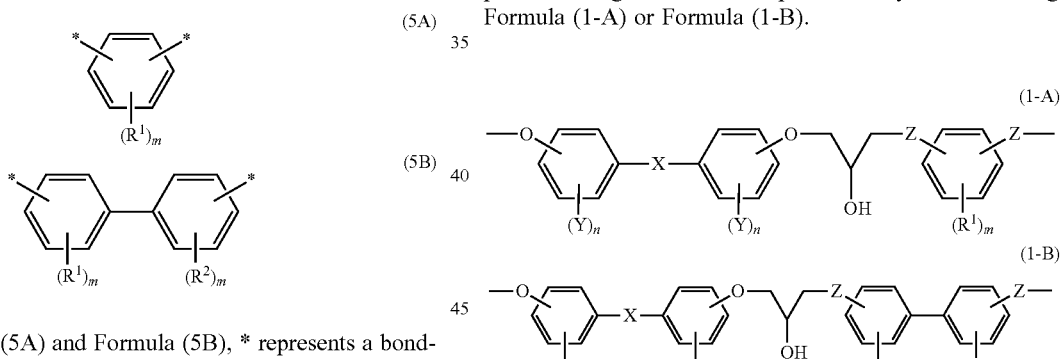

In Formulae (1-A) and (1-B), definitions and preferred examples of X, Y and n are the same as the definitions and preferred examples of X, Y and n in Formula (1). Definitions and preferred examples of $R^1$, $R^2$ and m are the same as the definitions and preferred examples of $R^1$, $R^2$ and m in Formulae (5A) and (5B). Each of Z independently represents —O— or —NH—.

Each of the benzene rings attached with $R^1$ or $R^2$ in Formulae (1-A) and (1-B) preferably has 2 to 4 hydrogen atoms, more preferably 3 or 4 hydrogen atoms, further preferably 4 hydrogen atoms.

From the viewpoint of forming a higher-order structure, the epoxy compound having a structure represented by Formula (1-A) is preferably an epoxy compound having a structure represented by Formula (2-A), and the epoxy compound having a structure represented by Formula (1-B) is preferably an epoxy compound having a structure represented by Formula (2-B).

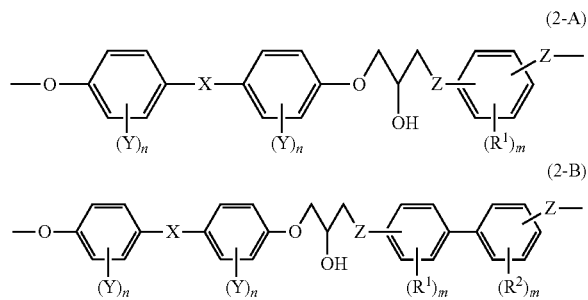

(2-A)

(2-B)

In Formulae (2-A) and (2-B), definitions and preferred examples of X, Y, n, m, $R^1$, $R^2$ and Z are the same as the definitions and preferred examples of X, Y, n, m, $R^1$, $R^2$ and Z in Formulae (1-A) and (1-B).

Examples of the epoxy compound having a structure represented by Formula (1-A) include an epoxy compound having a structure selected from the group consisting of the following Formulae (3-A-1) and (3-A-2).

Examples of the epoxy compound having a structure represented by Formula (1-B) include an epoxy compound having a structure selected from the group consisting of the following Formulae (3-B-1) and (3-B-2).

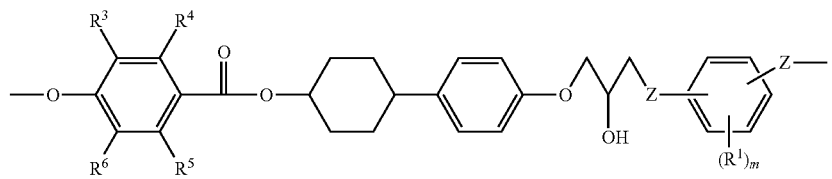

(3-A-1)

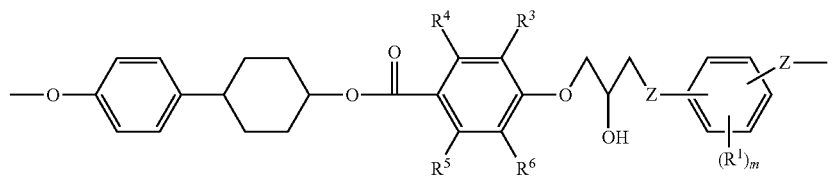

(3-A-2)

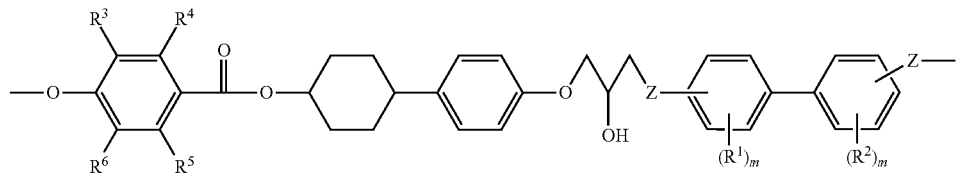

(3-B-1)

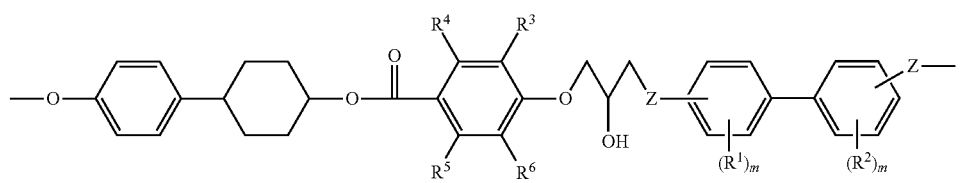

(3-B-2)

In Formulae (3-A-1), (3-A-2), (3-B-1) and (3-B-2), definitions and preferred examples of $R^3$ to $R^6$ are the same as the definitions and preferred examples of $R^3$ to $R^6$ in Formula (3). Further, the definitions and preferred examples of $R^1$, $R^2$, m and Z are the same as the definitions and preferred examples of $R^1$, $R^2$, m and Z in Formulae (1-A) and (1-B).

The number of the structure represented by Formula (1) in the specific epoxy compound is not particularly limited as long as it is two or more. From the viewpoint of reducing the viscosity during processing, at least a part of the specific epoxy compound is preferably a compound having two of the structure represented by Formula (1) (dimer compound).

Examples of the specific epoxy compound as a dimer compound include a compound represented by the following Formula (4-A-1) or (4-B-1).

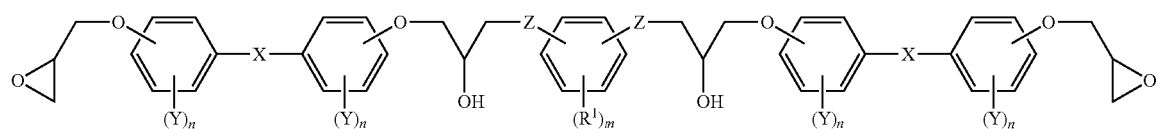
(4-A-1)

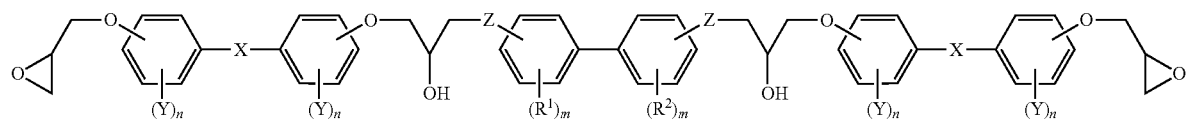
(4-B-1)

In Formulae (4-A-1) and (4-B-1), definitions and preferred examples of X, Y, n, m, $R^1$, $R^2$ and Z are the same as the definitions and preferred examples of X, Y, n, m, $R^1$, $R^2$ and Z in Formulae (1-A) and (1-B).

From the viewpoint of forming a higher-order structure, the epoxy compound having a structure represented by Formula (4-A-1) is preferably an epoxy compound having a structure represented by the following Formula (5-A-1), and the epoxy compound having a structure represented by Formula (4-B-1) is preferably an epoxy compound having a structure represented by the following Formula (5-B-1).

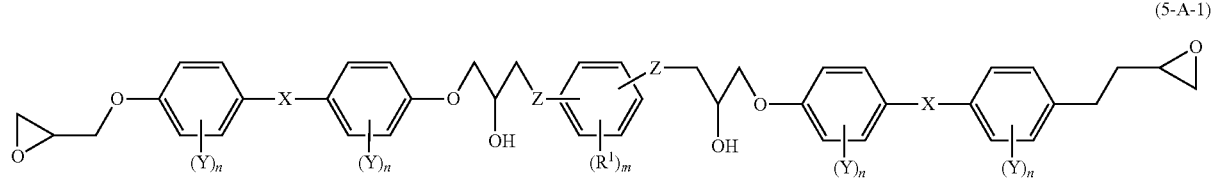
(5-A-1)

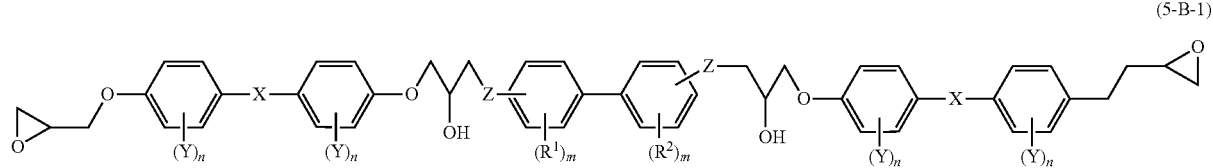
(5-B-1)

In Formulae (5-A-1) and (5-B-1), definitions and preferred examples of X, Y, n, m, $R^1$, $R^2$ and Z are the same as the definitions and preferred examples of X, Y, n, m, $R^1$, $R^2$ and Z in Formulae (4-A-1) and (4-B-1).

Specific examples of the epoxy compound having a structure represented by Formula (4-A-1) include an epoxy compound having a structure represented by the following Formulae (6-A-1) to (6-A-3).

Specific examples of the epoxy compound having a structure represented by Formula (4-B-1) include an epoxy compound having a structure represented by the following Formulae (6-B-1) to (6-B-3).

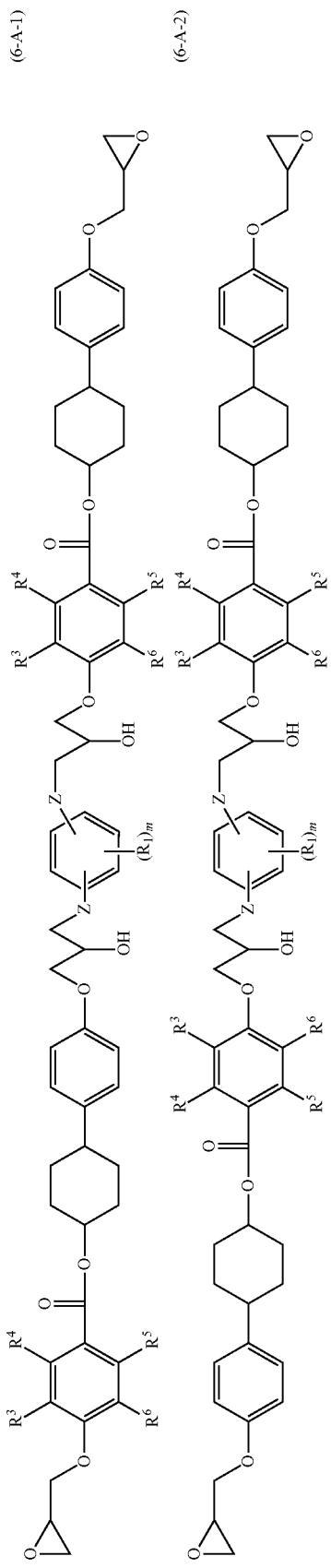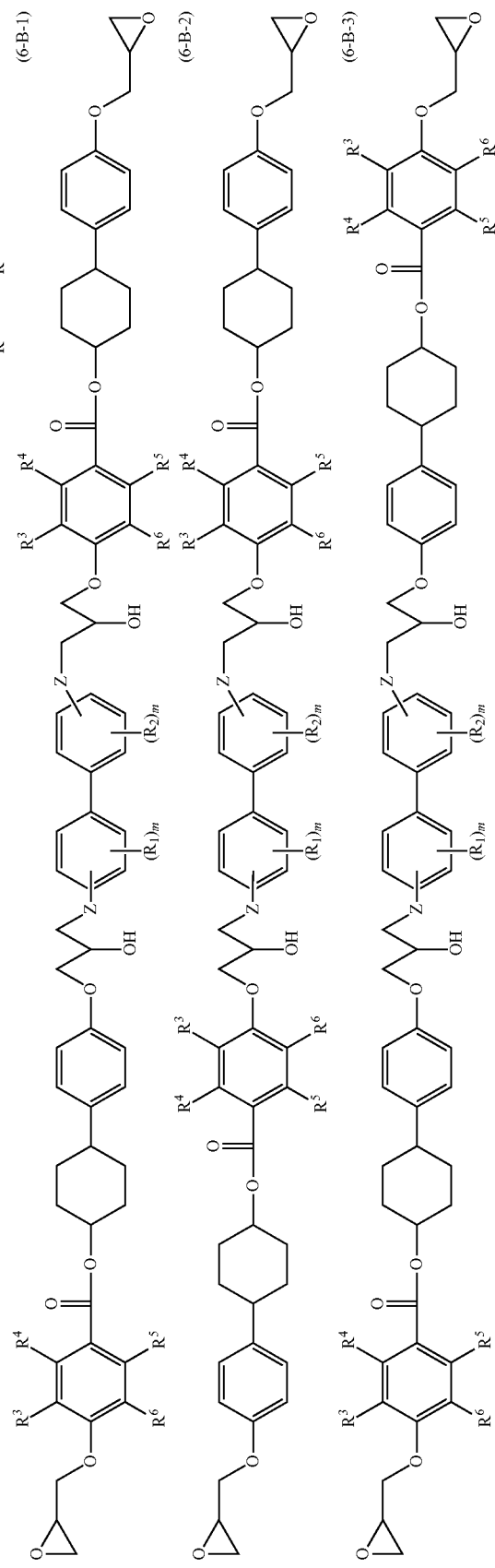

In Formulae (6-A-1) to (6-A-3) and Formulae (6-B-1) to (6-B-3), definitions and preferred examples of $R^3$ to $R^6$, $R^1$, $R^2$, m and Z are the same as the definitions and preferred examples of $R^3$ to $R^6$, $R^1$, $R^2$, m and Z in Formulae (3-A-1), (3-A-2) and Formulae (3-B-1) and (3-B-2).

(Method of Synthesizing Specific Epoxy Compound)

The method of synthesizing a specific epoxy compound is not particularly limited. For example, the specific epoxy compound may be obtained by allowing a compound having an epoxy group and a mesogenic structure (hereinafter, also referred to as a mesogenic epoxy monomer) to react with an aromatic compound having a functional group that can react with the epoxy group of the mesogenic epoxy monomer.

The mesogenic epoxy monomer may be a compound having a structure represented by the following Formula (1-m).

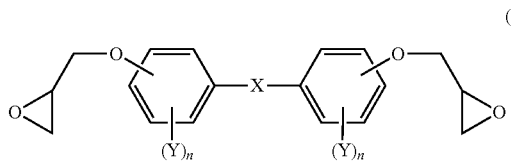

(1-m)

In Formula (1-m), definitions and preferred examples of X, Y and n are the same as the definitions and preferred examples of X, Y and n in Formula (1).

From the viewpoint of forming a higher-order structure, the mesogenic epoxy monomer represented by Formula (1-m) is preferably a mesogenic epoxy monomer having a structure represented by the following Formula (2-m).

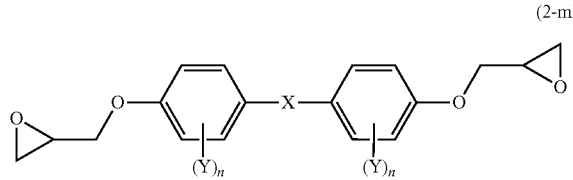

(2-m)

In Formula (2-m), definitions and preferred examples of X, Y and n are the same as the definitions and preferred examples of X, Y and n in Formula (1-m).

The mesogenic epoxy monomer represented by Formula (1-m) is more preferably a mesogenic epoxy monomer having a structure represented by the following Formula (3-m).

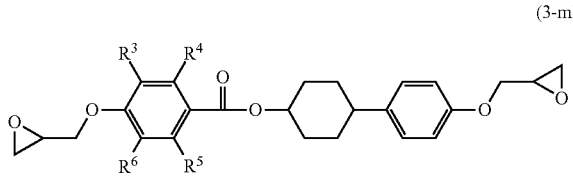

(3-m)

In Formula (3-m), definitions and preferred examples of $R^3$ to $R^6$ are the same as the definitions and preferred examples of $R^3$ to $R^6$ in Formula (3).

The method of reacting a mesogenic epoxy monomer and an aromatic compound having a functional group that can react with an epoxy group of the mesogenic epoxy monomer is not specifically limited. Specifically, for example, the reaction can be performed by dissolving a mesogenic epoxy monomer and an aromatic compound having a functional group that can react with an epoxy group of the mesogenic epoxy monomer, and optionally a reaction catalyst, in a solvent, and stirring the same while heating.

Alternatively, for example, the specific epoxy compound may be synthesized by mixing a mesogenic epoxy monomer and an aromatic compound having a functional group that can react with an epoxy group of the mesogenic epoxy monomer, without using a solvent, and stirring the mixture while heating.

The solvent used for the synthesis is not particularly limited, as long as it can dissolve a mesogenic epoxy monomer and an aromatic compound having a functional group that is capable of reacting with an epoxy group of the mesogenic epoxy monomer, and can be heated to a temperature required to cause reaction of the compounds. Specific examples of the solvent include cyclohexanone, cyclopentanone, ethyl lactate, propyleneglycol monomethyl ether, N-methyl pyrrolidone, methyl cellosolve, ethyl cellosolve, and propyleneglycol monopropyl ether.

The amount of the solvent is not particularly limited, as long as a mesogenic epoxy monomer and an aromatic compound having a functional group that is capable of reacting with an epoxy group of the mesogenic epoxy monomer, and optionally a reaction catalyst, can be dissolved at a reaction temperature. Although the degree of solubility depends on the type of the raw materials, the solvent and the like, the viscosity of the solvent after the reaction tends to be in a preferred range when the solvent is used in an amount that adjusts an initial solid content concentration to be from 20% by mass to 60% by mass, for example.

The aromatic compound having a functional group that is capable of reacting with an epoxy group of the mesogenic epoxy monomer is not particularly limited. From the viewpoint of forming a smectic structure in a cured product, the aromatic compound is preferably at least one selected from the group consisting of a dihydroxybenzene compound, having a structure in which two hydroxy groups are bonded to a benzene ring; a diaminobenzene compound, having a structure in which two amino groups are bonded to a benzene ring; a dihydroxybiphenyl compound, having a structure in which two hydroxy groups are bonded to each of the benzene rings that form a biphenyl structure, respectively; and a diaminobiphenyl compound, having a structure in which two amino groups are bonded to each of the benzene rings that form a biphenyl structure, respectively (hereinafter, also referred to as specific aromatic compounds).

Examples of the dihydroxy compound include catechol, resorcinol, hydroquinone and derivatives thereof.

Examples of the diaminobenzene compound include 1,2-diaminobenzene, 1,3-diaminobenzene, 1,4-diaminobenzene and derivatives thereof.

Examples of the dihydroxybiphenyl compound include 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl and derivatives thereof.

Examples of the diaminobiphenyl compound include 2,2'-diaminobiphenyl, 2,3'-diaminoibiphenyl, 2,4'-diaminobiphenyl, 3,3'-diaminobiphenyl, 3,4'-diaminobiphenyl, 4,4'-diaminobiphenyl and derivatives thereof.

Derivatives of the specific aromatic compound include a specific aromatic compound having a substitute, such as an alkyl group of from 1 to 8 carbon atoms, on the benzene ring.

A single kind of the specific aromatic compound may be used alone, or two or more kinds may be used in combination.

The type of the reaction catalyst is not particularly limited, and may be selected based on the reaction rate, reaction temperate, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of thermal resistance of a cured product, the reaction catalyst is preferably an organic phosphorous compound.

Preferred examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, dialkylarylphosphine and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the mesogenic epoxy monomer and the compound having a functional group that is capable of reacting with an epoxy group of the mesogenic epoxy monomer.

In a case of synthesizing a specific epoxy compound by using a mesogenic epoxy monomer, the total of the mesogenic epoxy monomer may react to form a specific epoxy compound, or the mesogenic epoxy monomer may partly remain in an unreacted state. From the viewpoint of thermal resistance as described later, the mesogenic epoxy monomer preferably partly remains in an unreacted state.

The specific epoxy compound can be synthesized by using a reaction container, such as a flask in a small scale or a reaction cauldron in a large scale. A specific example of the synthesis method is described below.

A mesogenic epoxy monomer is placed in a reaction container and a solvent is added as necessary, and the epoxy monomer is dissolved by heating the reaction container to a reaction temperature with an oil bath or a heating medium. Then, an aromatic compound having a functional group that is capable of reacting with an epoxy group of the mesogenic epoxy monomer is added thereto. After dissolving the compound in the solvent, a reaction catalyst is added as necessary, thereby starting the reaction. Subsequently, the solvent is removed under reduced pressure as necessary, whereby a specific epoxy compound is obtained.

The reaction temperature is not particularly limited, as long as the reaction of a mesogenic epoxy group and a functional group that is capable of reacting with an epoxy group can proceed. For example, the reaction temperature is preferably in a range of from 100° C. to 180° C., more preferably from 100° C. to 150° C. When the reaction temperature is 100° C. or higher, the time for completing the reaction tends to be shortened. When the reaction temperature is 180° C. or less, possibility of causing gelation tends to be reduced.

The ratio of the mesogenic epoxy monomer to the aromatic compound having a functional group that is capable of reacting with an epoxy group of the mesogenic epoxy monomer is not particularly limited. For example, the ratio may be adjusted to satisfy a ratio of the number of equivalent of epoxy group (A) to the number of equivalent of the functional group that is capable of reacting with an epoxy group (B), represented by A:B, of from 10:10 to 10:0.01. From the viewpoint of fracture toughness and heat resistance of a cured product, the range of A:B is preferably from 10:5 to 10:0.1.

From the viewpoint of ease of handling of an epoxy resin, the range of A:B is preferably from 10:1.6 to 10:3.0, more preferably from 10:1.8 to 10:2.9, further preferably from 10:2.0 to 10:2.8.

The structure of the specific epoxy compound can be determined by, for example, matching a molecular weight of the specific epoxy compound, which is presumed to be obtained by the reaction of the mesogenic epoxy monomer and the aromatic compound having a functional group that is capable of reacting with an epoxy group of the mesogenic epoxy monomer, with a molecular weight of a target compound obtained by liquid chromatography that is performed by a liquid chromatograph having a UV spectrum detector and a mass spectrum detector.

The liquid chromatography is performed by a gradient method using a column for analysis (for example, LaChrom II C16 from Hitachi, Ltd.) while continuously changing the mixture ratio (by volume) of the eluent in the order of acetonitrile/tetrahydrofuran/10 mmol/1 aqueous ammonium acetate solution=20/5/75, acetonitrile/tetrahydrofuran=80/20 (20 min from the start) and acetonitrile/tetrahydrofuran=50/50 (35 min from the start) at a flow rate of 1.0 ml/min. The UV spectrum detector detects an absorbance at a wavelength of 280 nm and the mass spectrum detector detects an ionization voltage as 2700 V.

The weight-average molecular weight (Mw) of the epoxy resin is not particularly limited. From the viewpoint of lowering the viscosity, the weight-average molecular weight (Mw) of the epoxy resin is preferably within a range of from 800 to 1300.

In the disclosure, the number-average molecular weight (Mn) and the weight-average molecular weight (Mw) of the epoxy resin is measured by liquid chromatography.

The liquid chromatography is performed at a sample concentration of 0.5% by mass and a flow rate of 1.0 ml/min, using tetrahydrofuran as a mobile phase. A calibration curve is obtained by using a polystyrene standard sample, and the Mn and Mw (polystyrene-based) are calculated.

The measurement can be performed by using a high performance liquid chromatograph (for example, L6000 from Hitachi, Ltd.) and a data analyzer (for example, C-R4A from Shimadzu Corporation) with GPC columns (for example, G2000HXL and G3000 HXL from Tosoh Corporation).

The epoxy equivalent amount of the epoxy resin is not particularly limited. From the viewpoint of achieving both fluidity of the epoxy resin and thermal conductivity of a cured product thereof, the epoxy equivalent amount is preferably from 245 g/eq to 360 g/eq, more preferably from 250 g/eq to 355 g/eq, further preferably from 260 g/eq to 350 g/eq.

When the epoxy equivalent amount of the epoxy resin is 245 g/eq or more, crystallinity of the epoxy resin is not too high and the fluidity is less likely to be lowered. When the epoxy equivalent amount of the epoxy resin is 360 g/eq or less, the crosslinking density of the epoxy resin is not too low and a high degree of thermal conductivity of a formed product tends to be achieved. In the disclosure, the epoxy equivalent amount of the epoxy resin is measured by perchloric acid titration.

The epoxy resin of the disclosure preferably includes both a specific epoxy compound and a mesogenic epoxy monomer. When a specific epoxy compound and a mesogenic epoxy monomer exist at a suitable proportion in an epoxy resin, a degree of crosslinking density during curing can be increased and a cured product having more suitable thermal resistance can be obtained. The proportion in amount of a specific epoxy compound and a mesogenic epoxy monomer can be adjusted by the amount of a mesogenic epoxy monomer and an aromatic compound having a functional group that can react with an epoxy group of the mesogenic epoxy monomer, or other reaction conditions.

<Epoxy Resin Composition>

The epoxy resin composition of the disclosure includes an epoxy resin as described above and a curing agent.

(Curing Agent)

The type of the curing agent included in the epoxy resin composition is not particularly limited. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. A single kind of the curing agent may be used alone, or two or more kinds may be used in combination.

From the viewpoint of forming a higher-order structure in a cured product of the epoxy resin composition, a curing agent is preferably an amine curing agent or a phenol curing agent, more preferably an amine curing agent, further preferably an amine compound having at least two amino groups that are directly bonded to an aromatic ring.

Specific examples of the amine curing agent include 3,3'-diaminodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide, and trimethylene-bis-4-aminobenzoate.

From the viewpoint of forming a smectic structure in a cured product of the epoxy resin composition, the curing agent is preferably 3,3'-diaminodiphenylsulfone, 4,4'-diaminodiphenylsulfone, 1,3-diaminobenzene, 1,4-diaminobenzene, 4,4'-diaminobenzanilide, 1,5-diaminonaphthalene, 4,4'-diaminodiphenylmethane or trimethylene-bis-4-aminobenzoate. From the viewpoint of obtaining a cured product having a low water absorption and high fracture toughness, the curing agent is more preferably 3,3'-diaminodiphenylsulfone.

Examples of the phenol curing agent include a low-molecular phenol compound and a phenol novolac resin, which is obtained by linking low-molecular phenol compounds with a methylene group or the like. Examples of the low-molecular phenol compound include a monofunctional phenol compound, such as phenol, o-cresol, m-cresol and p-cresol; a difunctional phenol compound, such as catechol, resorcinol and hydroquinone; and a trifunctional phenol compound such as 1,2,3-trihydroxybenzene, 1,2,4-trihydroxybenzene and 1,3,5-trihydroxybenzene.

The amount of the curing agent in the epoxy resin composition is not particularly limited. From the viewpoint of efficiency of curing reaction, the amount of the curing agent preferably satisfies a ratio of equivalent amount A of the functional group of the curing agent in the epoxy resin composition with respect to equivalent amount B of the epoxy group of the epoxy resin (A/B) of from 0.3 to 3.0, more preferably from 0.5 to 2.0.

(Other Components)

The epoxy resin composition may include components other than the epoxy resin and the curing agent. For example, the epoxy resin composition may include a curing catalyst, a filler or the like. Specific examples of the curing catalyst include the compounds as described above as a reaction catalyst used for the synthesis of the specific epoxy compound.

(Use Application)

The use application of the epoxy resin composition is not particularly limited. For example, the epoxy resin composition can be suitably used for a processing method that requires low viscosity and excellent fluidity. For example, the epoxy resin composition may be used for a process of producing FRPs (Fiber-Reinforced Plastics), in which fibers are impregnated with an epoxy resin composition while heating, or a process of producing a sheet-like product in which an epoxy resin composition is spread with a squeegee or the like while heating.

The epoxy resin composition is also suitably used for a method in which a solvent is desirably not added or reduced in order to suppress formation of voids in a cured product (such as production of FRPS used for aeroplanes or spaceships).

<Epoxy Resin Composition Cured Product and Composite Material>

The epoxy resin cured product of the disclosure is obtained by curing the epoxy resin composition as described above. The composite material of the disclosure includes the epoxy resin cured product and a reinforcing material.

Specific examples of the reinforcing material include carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone, or may include two or more kinds in combination.

EXAMPLES

In the following, the invention is explained by referring to the Examples. However, the invention is not limited to these Examples. The "part" and "%" are based on mass, unless otherwise specified.

Synthesis of Epoxy Resin 1

To a 500-mL three-necked flask, 50 parts by mass of (4-{4-(2,3-epoxypropoxy)phenyl}cyclohexyl=4-(2,3-epoxypropoxy)benzoate (following structure) were placed as the mesogenic epoxy monomer, and 80 parts by mass of propyleneglycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, 5.2 g of 4,4'-biphenol as a specific aromatic compound and 0.5 g of triphenylphosphine as a reaction catalyst were added, and further heated at 120° C. for 3 hours. Thereafter, propyleneglycol monomethyl ether was evaporated under reduced pressure, and the residue was cooled to room temperature (25° C.). Epoxy resin 1, in which a part of the mesogenic epoxy monomer is reacted with the specific aromatic compound to be in a state of epoxy compound B, was thus obtained.

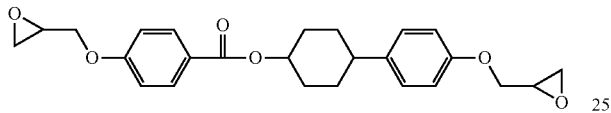

Synthesis of Epoxy Resin 2

Epoxy resin 2, in which a part of the mesogenic epoxy monomer is reacted with the specific aromatic compound to be in a state of epoxy compound A, was obtained in a similar manner to the synthesis of Epoxy Resin 1, except that 3.1 g of hydroquinone were used instead of 5.2 g of 4,4-biphenol.

Synthesis of Epoxy Resin 3

Epoxy resin 3, in which a part of the mesogenic epoxy monomer is reacted with the specific aromatic compound to be in a state of epoxy compound A, was obtained in a similar manner to the synthesis of Epoxy Resin 1, except that 3.1 g of resorcinol were used instead of 5.2 g of 4,4-biphenol.

(Pre-Treatment of Curing Agent)

160 g of 3,3-diaminodiphenylsulfone (Fujifilm Wako Pure Chemical Corporation) were pulverized with a pulverizer (Nano Jetmizer, trade name, HJ-50-B, Aishin Nano Technologies Co., Ltd.) at a pressure of 0.15 MPa and a processing rate of 240/hr, thereby obtaining 155 g of a powder having an average particle size of 8 μm. The obtained powder was used in the Examples and the Comparative Examples as described below.

Example 1

35.0 g of Epoxy Resin 1 and 15.0 g of Epoxy Resin 2 were placed in a plastic container and heated at 90° C. in a thermostatic chamber. Then, 9.5 g of 3,3'-diaminodiphenylsulfone were added thereto, and the mixture was stirred with a spatula for 1 minute. Subsequently, the mixture was stirred with a planetary centrifugal mixer at 1,600 rotations/min (rpm) for 30 minutes, thereby preparing an epoxy resin composition.

The epoxy resin composition was placed in a stainless dish treated with a mold release agent, and heated at 150° C. for 4 hours to cure the epoxy resin composition. After cooling the same to room temperature (25° C.), the epoxy resin cured product was taken out from the stainless dish. A sample for evaluation of fracture toughness, having a size of 3.75 mm×7.5 mm×33 mm, and a sample for evaluating glass transition temperature, having a size of 2 mm×0.5 mm×40 mm, were prepared from the epoxy resin cured product.

Example 2

An epoxy resin cured product was prepared in a similar manner to Example 1, except that 25.0 g of Epoxy Resin 1, 25.0 g of Epoxy Resin 2 and 9.6 g of 3,3'-diaminodiphenylsulfone were used. Samples for evaluation of fracture toughness and glass transition temperature were prepared in a similar manner to Example 1.

Example 3

An epoxy resin cured product was prepared in a similar manner to Example 1, except that 35.0 g of Epoxy Resin 1, 15.0 g of Epoxy Resin 3 instead of Epoxy Resin 2, and 9.7 g of 3,3'-diaminodiphenylsulfone were used. Samples for evaluation of fracture toughness and glass transition temperature were prepared in a similar manner to Example 1.

Example 4

An epoxy resin cured product was prepared in a similar manner to Example 1, except that 45.0 g of Epoxy Resin 1, 5.0 g of Epoxy Resin 2 and 9.5 g of 3,3'-diaminodiphenylsulfone were used. Samples for evaluation of fracture toughness and glass transition temperature were prepared in a similar manner to Example 1.

Example 5

An epoxy resin cured product was prepared in a similar manner to Example 1, except that 16.7 g of Epoxy Resin 1, 23.3 g of Epoxy Resin 2 and 9.7 g of 3,3'-diaminodiphenylsulfone were used. Samples for evaluation of fracture toughness and glass transition temperature were prepared in a similar manner to Example 1.

Comparative Example 1

An epoxy resin cured product was prepared in a similar manner to Example 1, except that 50.0 g of Epoxy Resin 1 and 9.4 g of 3,3'-diaminodiphenylsulfone were used. Samples for evaluation of fracture toughness and glass transition temperature were prepared in a similar manner to Example 1.

Comparative Example 2

An epoxy resin cured product was prepared in a similar manner to Example 1, except that 50.0 g of Epoxy Resin 2 and 9.8 g of 3,3'-diaminodiphenylsulfone were used. Samples for evaluation of fracture toughness and glass transition temperature were prepared in a similar manner to Example 1.

<Measurement of Dynamic Shear Viscosity of Epoxy Resin Composition>

The dynamic shear viscosity (Pa·s), measured with application of a high degree of shear stress, was used as an indicator of the viscosity stability of the epoxy resin composition. Specifically, the dynamic shear viscosity was measured with a parallel plate vibratory rheometer (MCR-301 from Anton-Paar GmbH) at a frequency of 1 Hz and a strain of 1000%.

In the measurement, the epoxy resin composition was placed on a stage heated at 90° C. to melt, and a parallel plate with a diameter of 12 mm was allowed to descend to create a gap of 0.2 mm. Subsequently, the temperature of the stage was adjusted to 80° C. and the measurement was started. The temperature was increased to 90° C. in the first 5 minutes, and retained at 90° C. The viscosity (initial viscosity) 10 minutes after the beginning of the measurement (5 minutes after the beginning of retention at 90° C.) and the viscosity 2 hours after the beginning of the measurement (1 hour and 55 minutes after the beginning of retention at 90° C.) were measured, respectively. The increase rate in viscosity was calculated by the following formula.

Increase rate in viscosity=viscosity 2 h after/initial viscosity

[Measurement of Fracture Toughness]

As an index for the fracture toughness of the epoxy resin cured product, the fracture toughness (MPa·m$^{1/2}$) of the sample was calculated based on the result of three-point bending test based on ASTM D5045, using Instron 5948 (Instron).

[Measurement of Dynamic Viscoelasticity]

As an index for the heat resistance of the epoxy resin cured product, the glass transition temperature (Tg) was used. The glass transition temperature of the sample was calculated from the result of the measurement of dynamic viscoelasticity at a tensile mode. The measurement was conducted at a frequency of 10 Hz, a temperature elevation rate of 5° C./min, and a torsion of 0.1%. The temperature corresponding to the maximum value of tan δ, in the obtained temperature-tan δ diagram, was regarded as the glass transition temperature. The measurement was conducted using RSA-G2 (TA Instruments).

[X-Ray Diffraction Measurement]

In order to determine whether or not a higher-order structure (smectic structure) was formed in the epoxy resin cured product, an X-ray diffraction measurement was performed using CuKα1 line, under a tube voltage of 50 kV, a tube current of 30 mA, a scan rate of 1°/min and a measurement range 2θ=2° to 30° using an X-ray diffractometer (Rigaku Corporation). When a diffraction peak is observed in a range of 2θ=2° to 10°, it was determined that a smectic structure is formed in the epoxy resin cured product.

The initial viscosity, the viscosity 2 hours after and the increase rate in viscosity of the epoxy resin compositions of Examples 1 to 5 and Comparative Examples 1 and 2 are shown in Table 1. Further, the fracture toughness, the glass transition temperature (Tg) and the existence or non-existence of smectic structure of the epoxy resin composition cured products of Examples 1 to 5 and Comparative Examples 1 and 2 are shown in Table 1. In Table 1, YES indicates that a smectic structure exists in the epoxy resin cured product.

TABLE 1

| | | Unit | Example 1 | Example 2 | Example 3 | Example 4 | Example 5 | Comparative Example 1 | Comparative Example 2 |
|---|---|---|---|---|---|---|---|---|---|
| Epoxy resin composition | Viscosity (initial) | Pa·s | 8.9 | 9.6 | 15.9 | 10.0 | 10.6 | 8.1 | >80 |
| | Viscosity (2 h after) | Pa·s | 10.6 | 12.6 | 17.4 | 19.5 | 12.9 | 148.0 | >500 |
| | Increase rate in viscosity | — | 1.19 | 1.31 | 1.10 | 1.96 | 1.22 | 18.27 | — |
| | Epoxy resin A:Epoxy resin B | | 3:7 | 5:5 | 3:7 | 1:9 | 6.6:3.4 | 0:10 | 10:0 |
| Cured product | Fracture toughness | Mpa·m$^{1/2}$ | 2.00 | 2.05 | 1.85 | 2.03 | 1.81 | 1.92 | 1.56 |
| | Tg | °C. | 168 | 168 | 167 | 169 | 169 | 170 | 170 |
| | Smecrtic structure | — | YES | YES | YES | YES | YES | YES | YES |

As shown in Table 1, the epoxy resin compositions of Examples 1 to 5, including both epoxy resin A (Epoxy Resin 2) and epoxy resin B (Epoxy Resin 1), exhibited a sufficiently low initial viscosity upon application of shear stress of as great as 1000%, and a suppressed increase in viscosity over 2 hours, indicating favorable viscosity stability. Further, the epoxy resin compositions of Examples 1 to 5 exhibited favorable fracture toughness and heat resistance.

The epoxy resin compositions of Comparative Example 1, including epoxy resin B but not including epoxy resin A, exhibited an increase rate in viscosity of more than 16 times as high as the initial viscosity, even though the initial viscosity was low. Further, it was difficult to regulate the thickness of a coating formed with the epoxy resin composition without a solvent.

The epoxy resin compositions of Comparative Example 2, including epoxy resin A but not including epoxy resin B, exhibited a significant increase in viscosity from the initial viscosity. Further, it was difficult to perform a coating process with the epoxy resin composition from the viewpoint of regulating the thickness of a coating or the fluidity.

The invention claimed is:

1. An epoxy resin composition, comprising:
   an epoxy resin comprising:
      an epoxy compound A that has at least two mesogenic structures and at least one phenylene group,
      an epoxy compound B that has at least two mesogenic structures and at least one divalent biphenyl group,
      wherein the ratio between epoxy compound A and epoxy compound B (epoxy compound A:epoxy compound B) is from 3:7 to 9:1; and
   a curing agent selected from the group consisting of 3,3'-diaminodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide, trimethylene-bis-4-aminobenzoate, phenol, o-cresol, m-cresol, p-cresol, catechol, resorcinol, hydroquinone, 1,2,3-trihydroxybenzene, 1,2,4-trihydroxybenzene, and 1,3,5-trihydroxybenzene.

2. The epoxy resin according to claim 1, wherein at least one of the epoxy compound A or the epoxy compound B has a structure in which the phenylene group or the divalent biphenyl group is disposed between the at least two mesogenic structures.

3. The epoxy resin according to claim 1, wherein at least one of the at least two mesogenic structures of at least one of the epoxy compound A or the epoxy compound B has a structure represented by the following Formula (3):

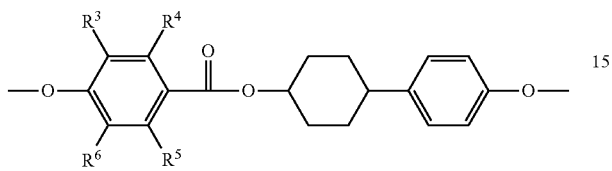

(3)

wherein, in Formula (3), each of $R^3$ to $R^6$ independently represents a hydrogen atom or an alkyl group having 1 to 3 carbon atoms.

4. The epoxy resin composition according to claim 1, being configured to form a smectic structure in a cured state.

5. An epoxy resin cured product comprising a cured product of the epoxy resin composition according to claim 1.

6. A reinforcing material, comprising the epoxy resin cured product according to claim 5 and a reinforcing material.

* * * * *